Patented Sept. 6, 1932

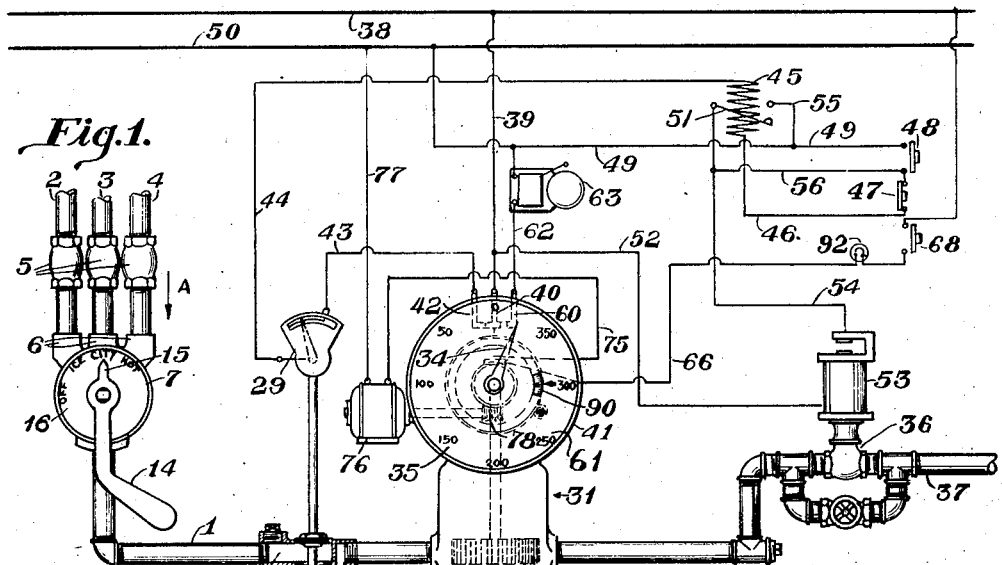

1,876,512

UNITED STATES PATENT OFFICE

FREDERIC D. PFENING AND HENRY PFENING, JR., OF COLUMBUS, OHIO, ASSIGNORS TO THE FRED D. PFENING COMPANY, OF COLUMBUS, OHIO, A CORPORATION OF OHIO

LIQUID MEASURING AND DISPENSING APPARATUS

Application filed September 9, 1930. Serial No. 480,680.

This invention relates to automatic liquid measuring apparatus. An object of the invention resides in the provision of a flow line through which the liquid to be measured is positively advanced, the passage of the liquid through the line being subject to the regulation of an electrically operated valve, which is connected in circuit with the flow indicating mechanism of a liquid flow recording meter, whereby when said mechanism assumes certain predetermined operating positions, following the passage of a desired quantity of liquid through the meter, the said regulating valve automatically is closed to arrest, or otherwise control, further liquid flow through the line.

It is another object of the invention to provide such automatic means for measuring liquid flow with circuit controlling devices by which the operation of said means may be controlled from a relatively remote point, for the purpose of effecting successive deliveries of desired volumes of liquid without requiring the attendant to be stationed immediately adjacent to the apparatus.

In our prior Patent No. 1,775,293 we have disclosed liquid measuring apparatus subject to the control of an electric circuit which, in turn, is controlled by the operation of an associate flow meter through which the liquid to be measured passes. However, in our earlier disclosure the operation is such that it is necessary for the attendant to adjust the indicating hand of the meter by a manual operation for each consecutive measuring operation of the meter. In practice, this has caused certain inconvenience due to the often remote location of the meter from the point of use of the liquid and, therefore, it is an outstanding object of the present invention to control the operation of the meter from a remote point with respect to said meter in a substantially automatic manner, avoiding specifically the repeated hand adjustments of the indicating dial heretofore utilized, and placing the apparatus in condition so that its operation may be conveniently effected at the point of use or delivery of the liquid.

It is another important object of the present invention to provide for improved regulation of the temperature of the liquids passed through the measuring system by the provision of a mixing valve through which liquids possessing refrigerated, normal and elevated temperatures are passed and intermingled, if desired, to obtain temperature regulation of the liquid which is delivered by the system and automatically measured thereby.

With these and other objects in view, which will appear as the description proceeds, the invention consists in the novel features of construction, combinations of elements and arrangements of parts herein fully described and pointed out in the appended claims.

In the accompanying drawings:

Figure 1 is a view in side elevation of the automatic liquid measuring apparatus comprising the present invention, the electrical connections and circuits utilized in conjunction therewith being shown diagrammatically, Figure 2 is a front view partly in vertical section of the dial of the flow meter and disclosing the circuit controlling means carried in connection therewith, Figure 3 is a vertical longitudinal sectional view taken through the dial on the line 3—3 of Figure 2, Figure 4 is a transverse sectional view on the line 4—4 of Figure 2, and Figure 5 is a detail horizontal sectional view.

Figure 6:
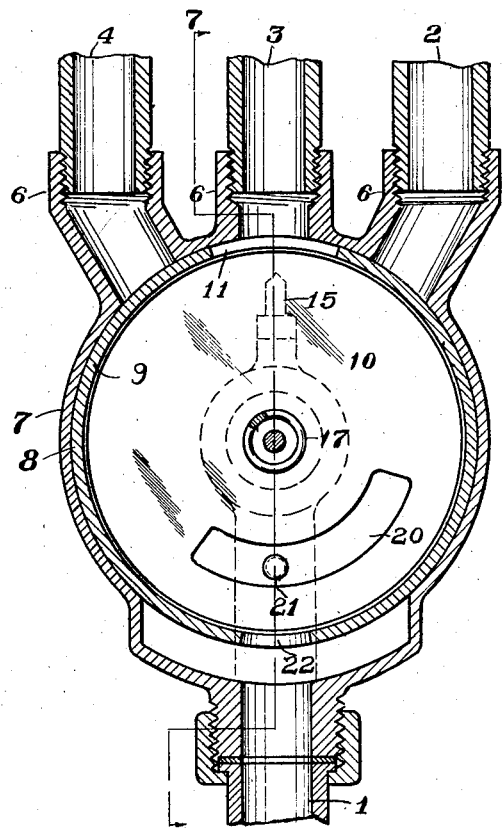
Fig. 6 is a section of the mixing valve.
Figure 7:
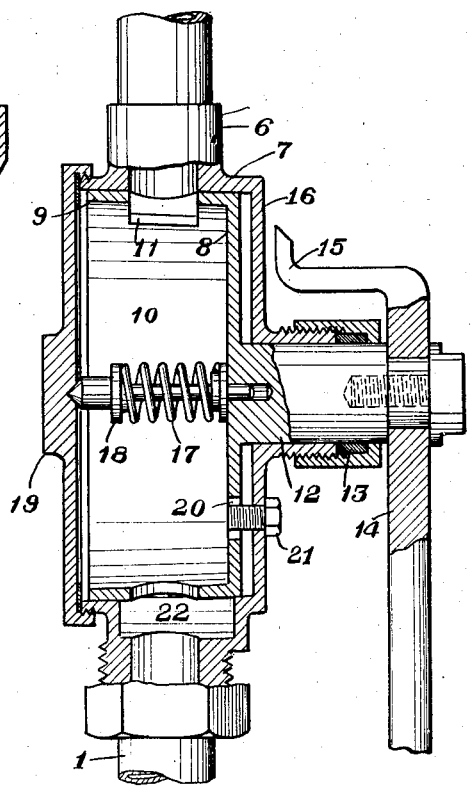
Fig. 7 is a section along line 7—7 of Fig. 6.
Figure 8:
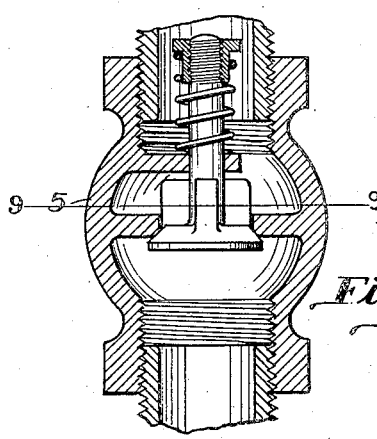
Fig. 8 is a section of one of the valves shown at 5 in Fig. 1.
Figure 9:
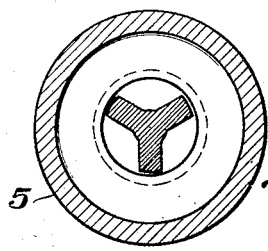
Fig. 9 is a section along line 9—9 of Fig. 8.

Referring to the drawings, the numeral 1 designates generally a liquid flow line comprising a plurality of related pipe sections through which a liquid is passed, measured and controlled. Any desired liquid may be utilized, although our invention is particularly applicable to the baking industry wherein it is necessary to use repeatedly measured quantities of water at certain desired temperatures. Heretofore the addition of water to dough mixes has not been carried out with any degree of certainty, buckets, pails and other rough measuring instruments being generally used to effect the addition of water at an approximately desired temperature to bakery mixes, and it is to provide a more accurate and readily controlled system for delivering water in such establishments that the present invention finds a field of use.

Water enters the flow line through a plurality of pipes indicated at 2, 3 and 4 under, for example, city main pressure, although other pressures may be used. Through the pipe 2 the water is of a sub-normal or refrigerated temperature, having previously passed through cooling or chilling apparatus (not shown) to obtain the desired temperature. Water flowing through the pipe 3 is at a normal water main temperature, while the water flowing through the pipe 4 is heated by suitable apparatus to a desired elevated temperature. The pipes 2, 3 and 4 are each equipped with a check valve 5 which limits the flow of the liquid through said pipes to the direction indicated by the arrow A.

The lower ends of the pipes 2, 3 and 4 enter branch nipples 6 formed with a circular casing 7 in which is positioned a rotatable and substantially circular valve member 8. This member comprises a collar 9 which closely engages and conforms with the curvature of the valve chamber 10 formed in said casing. The collar 9 is provided along its upper portion with a slot 11 which is of such length that it may bridge or register with at least two of the nipples 6 or may be positioned to register with but one of said nipples. By this arrangement water may pass through the valve member at the temperature prevailing in anyone of the pipes 2, 3 and 4, or by registering with a plurality of such nipples a desired average temperature of the liquid passing from the valve member may be obtained.

The valve member 8 includes an axial stud 12 journaled for rotation in a packed bearing 13 formed on the rear surface of the casing 7. This stud is connected at its outer end with an operating handle 14 provided with an indicating pointer 15 movable over a legend containing surface 16 provided upon the back wall of the casing 7, as shown in Figure 1. By noting the positions of the pointer 15 with relation to the surface 16 the attendant is informed generally as to the temperature of the water passing through the mixing valve or when the valve is closed to arrest liquid flow. The positions of the rotatable valve member 8 are maintained by the provision of a spring 17 arranged axially in the mixing valve. This spring surrounds a pin 18, which is carried by the removable front wall 19 of the casing and the stud 12. The spring 17 presses at one end on a fixed collar formed with the pin 18 and at its other end on a loose collar which is slidably carried by said pin and frictionally engages with one of the surfaces of the valve member 8. The pressure exerted by the spring on the movable collar produces sufficient friction to retain the rotatable valve member in its adjusted positions. Additionally, the valve member is slotted as at 20 and receives therein a stationary screw 21 connected with the back of the casing 7. The screw 21 by reason of its positions in the slot 20 limits the extent of rotation of said valve member. The liquid after entering the casing leaves the latter by way of a port 22 formed in the bottom of the collar 9 and is discharged from the mixing valve into the flow line 1. Manifestly, by means of this valve mechanism a desired temperature of the liquid entering the flow line is obtainable and this temperature possesses a range between the extremes of temperature of the liquids entering the system through the lines 2, 3 and 4.

Disposed in the flow line 1 is a casing 23 which includes inlet and outlet chambers 24 and 25, respectively. These chambers are separated by a strainer 26 adapted to remove undesired solid matter or sediment from the liquid. The bottom of the casing 23 is formed with a drain valve 27. Also carried by the casing 23 is a temperature responsive element 28 which is connected with a visible temperature indicator 29. As will be later described, this temperature indicator forms a part of an electrical circuit for governing liquid flow through the line 1 so that not only does the indicator serve to denote the temperature of the liquid passing through the line 1, but, in addition, it serves in the capacity of an automatic switch for arresting such liquid flow when a certain predetermined peak temperature has been obtained.

The liquid discharged from the outlet chamber of the casing 23 continues on through the flow line and passes through the rotor chamber 30 of a liquid flow meter 31. As usual, the meter 31 has positioned in the chamber 30 a rotor 32 which is rotated by the passage of the liquid through the chamber 30. The rotation or operation of the rotor 32 effects the rotation of an indicator shaft 33, which has mounted on its outer end a hand 34 movable over a graduated stationary dial 35. This dial has mounted thereon graduations which indicate pounds in liquid, although other arbitrary units of measurement may be utilized, depending upon the specific uses of the apparatus.

After passing through the flow meter 31 the liquid continues its flow through the line 1 and passes a solenoid or magnetic valve 36. This valve is connected in circuit with the meter 31 and the operation of the mechanism is such that after a desired quantity of liquid has passed through the meter, the coil of the valve 36 will be de-energized to effect the closing of the valve 36 and to arrest thereby further flow of liquid through the discharge portion 37 of the line 1, and it is an outstanding feature of the present invention to provide improved circuit controlling means between the meter and the solenoid valve in regulating liquid flow through and from the line 1.

Referring now more particularly to Figure 1, electrical current enters the trunk line 38 and then passes by way of a line 39 to a movable switch finger 40 carried by the dial casing 41 of the meter. The finger 40 is normally in contact with a stationary contact finger 42 also carried by the casing 41, and from the finger 42 a lead 43 connects said stationary finger with the temperature indicator 29. Within certain temperature limits current passes through the indicator 29 and flows by way of a line 44 to a coil 45. After passing through the coil 45 the current passes through a line 46 and through a normally closed stop switch 47 through a starting switch 48 which usually is of the press button type and requires manual operation against a spring pressure to effect its closure. From the switch button 48 the current then passes by way of a line 49 to the return trunk line 50 of the circuit. It will thus be observed that the closing of the switch 48 results in exciting the field of the coil 45 which, in turn, results in attracting an armature 51, moving the latter from its normal opened to a circuit closing position and which thereby energizes the coil of the solenoid valve 36. This is accomplished by means of the lead line 52 which is connected with the line 39 and passes to the coil 53 of the solenoid valve. From the coil 53 a line 54 extends to the armature 51 and since the armature is in a circuit closing position the current passes into a pressure line 55 which is connected with the return lines 49 and 50. Since the starting button 48 assumes an open position immediately after its release, the current flowing from the line 55 must pass to the return trunk 50. Thus the pressing of the button 48 energizes the coil 53 of the solenoid valve, and results in the opening of said valve and the maintenance of liquid flow through the line 1.

To retain the coil 45 energized after the button 48 has been released, current, in addition to flowing through the line 52, is also shunted through the line 43, the temperature indicator 29 and the line 44 to the coil 45. This shunt circuit passes through the coil 45 and into the line 46, and thence through the stop button 47 and through a short lead 56 to the line 54 and thence through the armature 51 to the lines 49 and 50. In this manner the solenoid valve is maintained energized following the initial closing of the circuit governed by the button 48 and it is not necessary to maintain finger pressure on the button 48 to keep the solenoid valve energized.

In order to automatically break the circuit leading to the solenoid valve, following the passage of a predetermined quantity of liquid through the flow line, the indicator shaft 33 of the flow meter has mounted thereon a split frictional sleeve 57, which carries at its outer end the indicator hand 34. Behind the dial 35 the sleeve 57 is formed with an arm 58 which is rotatable with the shaft 33. This arm is of sufficient length that when in an upright vertical position it will engage with a spring strip 59 which depends from the movable switch finger 40. This finger may be either gravity or spring operated so that the normal tendency thereof is to maintain its contact with the stationary finger 42.

Since the dial shaft 33 is positively rotated from the rotor 32 it follows that when the arm 58 has been rotated to a predetermined extent it will contact with the spring strip 59 thereby moving the finger 40 from engagement with the stationary finger 42 to break the circuit which controls the exciting of the coil 45. This permits the armature 51 to assume an open position so that the circuit in which the coil 53 of the solenoid valve is situated is also open. The valve 36 then automatically assumes a position of closure under spring or other pressure to arrest liquid flow through the line. It will be understood that the strip 59 is sufficiently resilient so that when the upper end of the arm 58 is engaged therewith the movable finger 40 will move with said arm until the finger 40 engages with a stationary stop 60. The strip 59 then flexes to permit the arm 58 to move past the same. When the finger 40 is thus freed from engagement with the arm 58 it automatically returns to its normal position in contact with the finger 42. Thus the dial hand 34 may be moved to any position on the graduated surface of the dial 35. For instance, if it is desired to measure 300 pounds of water the hand 34 may be turned manually until it registers with the numerals 300 on the graduated surface 61 of the dial 35 which movement of the hand 34 frees the arm 58 from engagement with the strip 59. When the hand 34 registers with the numeral 300 on the surface 61 the starting button 48 may be pressed. This results, as previously explained, in the excitation of the solenoid valve and the consequent opening of said valve to admit of liquid flow through the system. The passage of such liquid revolves the rotor 32, the hand 34 and the arm 58 so that when the hand reaches a zero position on the graduated surface 61 the upper end of the arm 58 engages again with the spring strip 59 to move the finger 40 into engagement with the finger 42, thus de-energizing the solenoid valve and automatically arresting liquid flow through the system. If for any reason the solenoid valve should not close when the finger 40 is moved by the arm 58 from engagement with the stationary finger 42, the continued rotation of the hand 34 and the arm 58 past the zero position on the scale 61 results in causing the finger 40 to engage with the stationary stop 60, so that current will pass from the line 39, through the finger 40 thence into the stop 60 and through the lead 62 to a bell or other audible or visual signal 63, and the return side of this signal is connected with the outgoing line 49. Thus if the valve 36 should stick or fail to close for any other reason, in addition a signal will be provided notifying the attendant of the situation to permit proper adjustments to be made. The system, of course, is also under the control of the stop switch 47 and if for any reason it is desired to stop the operation of the same at any point, the mere opening of the switch 47 will instantly stop liquid flow through the system.

It is quite desirable in a system of this character to be able to control the operation of the meter from a distance. Thus in a bakery establishment, for example, the apparatus consisting of the mixing valve 7, the flow meter, the temperature indicator and the solenoid valve and associated piping is commonly disposed in a single casing (not shown) located at an elevated point on the wall of a room. The attendant at a machine using successive quantities of water of predetermined weight would have his operations seriously hampered by adjusting manually the hand 34 for each operation of the system. To avoid this condition we have associated with the flow meter automatic mechanism which may be controlled from a relatively remote point from the meter for the purpose of effecting successive deliveries of desired volumes of liquid without requiring the attendant to be stationed immediately adjacent to the apparatus or to adjust such apparatus manually for each operation.

To attain this end there is mounted on the sleeve 57 for rotation therewith a collar 64 formed from a suitable insulating material. This collar is provided with a pair of spaced collector rings 65 and a lead line 66 through the medium of a brush 67 engages with one of said rings. The line 66 is connected with the positive trunk line 38 and a manually operated switch button 68 is disposed in the line 66 to control passage of current therethrough. A lead 70 is connected with one of the rings 65 and with a resilient switch member 72 which is carried by the outer portion of the arm 58. This switch member is normally in engagement with a stationary switch member 73 which is also carried by the arm 58 and is normally in contact with the member 72. A lead 74 extends from the stationary switch member 73 to the other of the collector rings 65 and from this latter collector ring a lead line 75 extends to an electric motor 76, and a return line 77 leads from said motor to the negative trunk line 50.

The motor 76 has its armature shaft provided with a worm 78 which meshes with a worm gear 79 loosely mounted on the dial shaft 33. This worm gear has one side thereof provided with a recess 80 in which is positioned a movable dog or pawl 81 normally pressed outwardly by a spring 82, the outward movement of the pawl being limited by the engagement of a flat surface 83 thereof with one of the walls of the recess 80. The provision of the pawl 81 and its manner of mounting in the gear 79 enables the arm 58 to be revolved in unison with the gear 79 when the motor 76 is energized.

To break the motor circuit in order to stop the arm 58 at any desired position, the rear surface of the dial 35 is provided with a plurality of brackets 84 which support for rotation upon the inner surface of the dial and around the axis provided by the shaft 33 an adjustable contact ring 85. This ring or gear has its outer edge provided with gear teeth 86 which mesh with the teeth of a pinion 87 also arranged on the inner side of the dial 35. The pinion 87 is carried by a stud shaft 88 which is adapted to be rotated by a key or otherwise in order that when so rotated the operating positions of the ring 85 may be varied or adjusted at will. The ring 85 is also provided with graduations 89 indicating pounds or other units of measurement and corresponding to the graduations 61 on the dial 35. The graduations 89 are viewable through a slot 90 formed in the front face of the dial. The ring 85 carries a fixed pin 91 which is arranged in the path of the resilient switch member 72, so that when the arm 58 is revolved by the motor 76 to a predetermined extent the arm 58 will contact with the pin 91 to cause a separation between the members 72 and 73 and the opening thereof of the motor circuit 66. The line 66 may be provided with a visual signal 92 to notify the attendant when the circuit leading to the motor 76 is closed and when it is open.

With this mechanism it will be assumed, for example, that an attendant requires repeated deliveries of 300 pounds of liquid. This is often the case in bakery establishments where such successive deliveries of predetermined quantities of liquid are needed and there is little if any variation in the weight of the liquid deliveries required. To accomplish such successive deliveries the ring 85 is rotated through the pinion 87 until the numerals 300 on the graduated surface 89 appear in the center portion of the slot 90. This results in moving the pin 91 a considerable distance from the normal upright position of the arm 58. The operating switch 68 is then closed and it should be said at this time that the switch 68 is arranged immediately adjacent to the operator and may be spaced at any desired distance from the balance of the apparatus. The closing of the switch 68 results in energizing the motor 76 so that rotary motion will be imparted to the arm 58 through the medium of the motor driven worm gear 79 and the pawl 81. When the arm 58 has thus been revolved by the motor to the requisite position of setting to pass 300 pounds of water through the flow line the switch 72 engages with the pin 91 to break the motor circuit in an automatic manner and the fact that the circuit is broken is disclosed by the visual signal arranged in the line 66. The button 68 is then released and the switch button 48 is closed which results in the energizing of the solenoid valve 36 and the desired passage of liquid through the system. After 300 pounds, or other arbitrary unit of measurement, of liquid has passed through the system, the arm 58 contacts with the finger 40 and breaks the solenoid circuit, thus completing the cycle of operation. The sleeve 57 is split in order that it may turn on the shaft 33 when the latter is held stationary during the period of closure of the valve 36 and particularly when the arm 58 is turned by the pawl 81 to reset the switch mechanism.

In view of the foregoing it will be seen that the present invention provides for the passage of liquid of desired temperature through a liquid flow line wherein provision is made in the flow line for automatically predetermining the quantity of liquid passing therethrough for any given operation. If the temperature of the liquid should exceed certain limits, the indicator 29 interrupts the passage of current through the lines 43 and 44, thereby automatically de-energizing the solenoid valve and arresting liquid flow. The construction of the circuit controlling mechanism employed in conjunction with the flow meter is such as to provide for manual operation so that the liquid quantities passed through the system may vary with each operation or if such liquid quantities are the same and are successively required the circuit controlling mechanism may be automatically operated from a distance for convenience and for the purpose of expediting operations on the part of the attendant. By adjusting the ring 85 any desired number of pounds of liquid may be passed through the system varying from zero to 400 and this, of course, is subject to variation and apparatus having larger capacities or intended for different fields of use.

What is claimed is:

1. In liquid measuring and dispensing apparatus, a liquid flow line, a magnetic valve arranged in said flow line for controlling the passage of liquid therethrough, a flow registering meter connected with said flow line, switch mechanism actuated by said flow meter for controlling the operation of said valve, and means including a motor remotely controlled for resetting said switch mechanism subsequent to a given flow of liquid through said flow line.

2. In liquid measuring and dispensing apparatus, a liquid flow line, a magnetic valve situated in said flow line and serving when energized to admit of liquid flow through said line and when de-energized to arrest liquid flow through said line, a flow registering meter in said line including a rotatable member, circuit making and breaking devices cooperative with said meter for controlling the energizing and de-energizing of said magnetic valve in response to predetermined operation of said meter through the rotation of said member, and manually controlled motor operated means for restoring said devices to a selected initial position of operation after each cycle of operation of the meter.

3. In liquid measuring and dispensing apparatus, a liquid flow line, a solenoid valve positioned in said flow line for regulating liquid passage therethrough, a registering meter arranged in said flow line in advance of said solenoid valve, relatively separable normally engaging contacts carried in conjunction with said meter, a starting circuit passing through said contacts, a magnetic primary field in said starting circuit, a manually operated switch in said starting circuit operable when closed to initially excite said field, a main circuit passing through the coil of said solenoid valve, a relay switch in said main circuit responsive to the excitation of said field to close said main circuit whereby to energize the coil of said solenoid valve to admit of liquid passage through said line, and rotatable means actuated by said meter following predetermined passage of liquid through said line to separate said contacts whereby to open said main circuit and to thereby effect the closure of the solenoid valve.

4. In liquid measuring and dispensing apparatus, a liquid flow line, a solenoid valve positioned in said flow line to govern liquid passage therethrough, a flow registering meter positioned in said flow line, relatively separable normally engaging contacts carried in conjunction with said meter, a starting circuit passing through said contacts and including a localized magnetic field and a manually operated switch, the closing of said switch effecting initial excitation of said field, a main circuit passing the coil of said solenoid valve, a relay switch responsive to the excitation of said field to close said main circuit, a secondary circuit operable upon the closing of said relay switch to maintain the excitation of said field independently of said starting circuit, and a circuit breaking device operated by said flow meter for separating said contacts following predetermined passage of liquid through said meter and flow line.

5. In liquid dispensing and measuring apparatus, a liquid flow line, a solenoid valve positioned in said flow line and provided with an operating coil, a flow registering meter disposed in said flow line, normally engaging separable contacts carried in connection with said flow meter, a starting circuit passing through said contacts, a localized magnetic field in said starting circuit, a manually operated switch in said starting circuit for initially energizing said field, a main circuit including the coil of said solenoid valve, a relay switch in said main circuit responsive to the excitation of said field to close said main circuit, a third circuit passing through said contacts and operable to maintain the excitation of the field in the starting circuit, and a movable circuit breaking device actuated by said meter following predetermined passage of liquid through the flow line to effect the opening of the third circuit and the de-energizing of said field, said circuit closing device being adjustable independently of the operation of said meter.

6. In apparatus for measuring and regulating liquid flow, a liquid flow line including a solenoid operated valve and a flow meter, switch means carried by said meter, a circuit passing through said switch means and the coil of said solenoid valve, a manually operated switch for closing the circuit to energize the coil of the solenoid valve, and a supplemental circuit for maintaining said coil energized following release of the manually operated means, circuit breaking means operated directly by said meter following predetermined passage of liquid through the flow line to open the switch means on said meter automatically to deenergize the coil of the solenoid valve, and a signal adapted to be energized by the operation of said switch means in the event of failure of the solenoid valve to arrest liquid flow through said line following such predetermined operation of the meter.

7. In liquid measuring and dispensing apparatus, a liquid flow line, a solenoid valve in said flow line, a flow meter in said line, contacts carried by said meter, a circuit including the coil of said solenoid valve, manually operated means for closing said circuit, a rotatable circuit interrupter positively driven by said meter and situated to engage said contacts to open the circuit of said solenoid following predetermined passage of liquid through the meter, and motor driven remotely controlled means for returning said interrupter to a desired initial position of operation.

8. In liquid measuring and dispensing apparatus, a liquid flow line, a solenoid valve in said flow line, a flow meter in said line, contacts carried by said meter, a circuit including the coil of said solenoid valve, manually operated means for closing said circuit, a rotatable circuit interrupter positively driven by said meter and situated to engage said contacts to open said circuit of said solenoid following predetermined passage of liquid through the meter, means for returning said interrupter to a desired initial position of operation, said means comprising a motor, motion transmitting devices between said motor and said interrupter, and switch devices carried by said interrupter and engageable with an adjustable stop following predetermined operation of the motor to open the operating circuit of said motor.

9. In liquid measuring and dispensing apparatus, a flow meter, a shaft driven by the operation of the flow meter in response to liquid passage through the meter, an arm frictionally mounted on said shaft and normally rotatable in unison therewith, a worm gear loosely mounted on said shaft, a motor, a worm driven by said motor for effecting the rotation of the worm gear, a spring pressed pawl carried by said worm gear and engageable with said arm to effect the rotation of the arm in unison with said worm gear when the latter revolves in a predetermined direction only, a motor circuit, and switch means carried by said arm and engageable with an adjustable stop device to effect the opening of the motor circuit following predetermined rotation of said arm.

10. In liquid measuring and dispensing apparatus, a liquid flow registering meter including a shaft rotatable by the passage of liquid through the meter, an arm frictionally mounted on said shaft to normally rotate with said shaft but capable of rotating independently of the shaft, a motor, motion transmitting mechanism driven by said motor for revolving said arm about said shaft in one direction only, a circuit for said motor, switch means carried by said arm and through which said circuit passes, and an adjustable stop device co-operative with said switch means to effect the opening of the motor circuit following predetermined rotation of said arm.

11. In liquid measuring and dispensing apparatus, a liquid flow meter including a rotatable shaft movable in response to liquid flow through the meter, a circuit controlling arm frictionally mounted on said shaft adapted to rotate normally in unison with the shaft but rotatable independently of said shaft upon application of pressure, a motor, motion transmission means driven by said motor for positively effecting the rotation of said arm about said shaft in one direction, a circuit for said motor, switch devices carried by said arm through which said circuit passes, and a ring rotatable about the axis of said shaft, said ring being provided with a laterally projecting stud arranged in the path of movement of said switch devices to effect the opening of the motor circuit following predetermined operation of said arm.

12. In liquid measuring and dispensing apparatus, a liquid flow meter including a rotatable shaft movable in response to liquid flow through the meter, a circuit controlling arm frictionally mounted on said shaft adapted to rotate normally in unison with the shaft but rotatable independently of said shaft upon application of pressure, a motor, motion transmission means driven by said motor for positively effecting the rotation of said arm about said shaft in one direction, a circuit for said motor, switch devices carried by said arm through which said circuit passes, a ring rotatable about the axis of said shaft, said ring being provided with a laterally projecting stud arranged in the path of movement of said switch devices to effect the opening of the motor circuit following predetermined operation of said arm, and manually operated means for rotating said ring and the pin carried thereby about the axis of said shaft.

13. In liquid measuring and dispensing apparatus, a liquid flow line, a solenoid valve positioned in said flow line, a registering meter arranged in said flow line, circuit controlling means carried in conjunction with the meter, a circuit passing through said means for governing the energizing of the solenoid valve, and a plurality of manually operated switch devices arranged remotely with respect to said meter and valve and operable to control the initial energizing of said valve and the restoration of the circuit controlling means on said meter to a repeating operating position following the automatic de-energizing of said valve.

14. In liquid measuring and dispensing apparatus, a liquid flow line, a flow meter arranged in said line, a solenoid valve arranged in said line on the outlet side of said meter, a plurality of electric circuits between said meter and the coil of said valve, and a plurality of manually operated switches arranged remotely with respect to said meter and valve and operable to effect first the energizing of said valve and second the restoration of the circuit controlling means on said meter to a predetermined initial position of operation following automatic de-energizing of said valve.

15. In a liquid measuring and dispensing apparatus, a liquid flow meter including a rotatable shaft movable in response to liquid flow through the meter, a circuit controlling arm frictionally mounted on said shaft adapted to rotate normally in unison with the shaft but rotatable independently of said shaft upon application of pressure, a motor, motion transmission means driven by said motor for positively effecting the rotation of said arm about said shaft in one direction, a circuit for said motor, switch devices carried by said arm through which said circuit passes, a stationary meter dial having a sight opening therein, a second dial rotatable about the axis of said shaft and viewable through said opening, the second dial having graduations thereon similar in number to that of the first dial, means for effecting the rotation of said second dial, and means formed with the latter dial and arranged in the path of movement of said switch devices to effect the opening of the motor circuit following predetermined operation of said arm.

16. In liquid measuring and dispensing apparatus, a liquid flow meter including a rotatable shaft movable in response to liquid flow through the meter, a circuit controlling arm frictionally mounted on said shaft adapted to rotate normally in unison with the shaft but capable of rotation independently thereof, a motor, motion transmission means driven by said motor for revolving said arm about said shaft in one direction only, a circuit for said motor, switch means carried by said arm through which said circuit passes, a stationary meter dial having a sight opening therein, a graduated member rotatable about the axis of said shaft and viewable through said opening, said graduated member having numbers thereon similar to that of said dial, means for effecting the rotation of said graduated member, and means formed with the graduated member and arranged in the path of movement of the switch means carried by said arms to effect the opening of the motor circuit following predetermined rotary movement of said arm.

17. In liquid measuring and dispensing apparatus, a liquid flow registering meter, including a shaft rotatable by the passage of liquid through the meter, an arm frictionally mounted on said shaft to normally rotate with said shaft but capable of rotation independently thereof, a motor, motion transmission mechanism driven by said motor for revolving said arm about said shaft in one direction only, a circuit for said motor, switch means carried by said arm and through which said circuit passes, a stationary meter dial, an adjustable stop device arranged back of said dial to effect the opening of the motor circuit following predetermined rotation of said arm, and means formed in connection with said dial for determining the location of said stop device.

In testimony whereof we affix our signatures.

FREDERIC D. PFENING.
HENRY PFENING, Jr.